(12) United States Patent
Ning

(10) Patent No.: US 11,886,287 B2
(45) Date of Patent: Jan. 30, 2024

(54) READ AND WRITE METHODS AND MEMORY DEVICES

(71) Applicant: CHANGXIN MEMORY TECHNOLOGIES, INC., Anhui (CN)

(72) Inventor: Shuliang Ning, Hefei (CN)

(73) Assignee: CHANGXIN MEMORY TECHNOLOGIES, INC., Anhui (CN)

( * ) Notice: Subject to any disclaimer, the term of this patent is extended or adjusted under 35 U.S.C. 154(b) by 305 days.

(21) Appl. No.: 17/310,415

(22) PCT Filed: Nov. 20, 2020

(86) PCT No.: PCT/CN2020/130391
§ 371 (c)(1),
(2) Date: Jul. 31, 2021

(87) PCT Pub. No.: WO2021/196663
PCT Pub. Date: Oct. 7, 2021

(65) Prior Publication Data
US 2022/0317890 A1 Oct. 6, 2022

(30) Foreign Application Priority Data

Apr. 1, 2020 (CN) .......................... 202010250023.3

(51) Int. Cl.
*G06F 11/00* (2006.01)
*G06F 11/10* (2006.01)
(Continued)

(52) U.S. Cl.
CPC ........ *G06F 11/1016* (2013.01); *G06F 3/0616* (2013.01); *G06F 3/0647* (2013.01);
(Continued)

(58) Field of Classification Search
None
See application file for complete search history.

(56) References Cited

U.S. PATENT DOCUMENTS

| 5,841,711 A | 11/1998 | Watanabe |
| 5,996,096 A | 11/1999 | Dell et al. |

(Continued)

FOREIGN PATENT DOCUMENTS

| CN | 101593157 A | 12/2009 |
| CN | 101777013 A | 7/2010 |

(Continued)

OTHER PUBLICATIONS

Google Scholar/Patents search—text refined (Year: 2023).*
(Continued)

*Primary Examiner* — Christopher S McCarthy
(74) *Attorney, Agent, or Firm* — Syncoda LLC; Feng Ma

(57) ABSTRACT

A read and write method includes: applying a read command to a memory device, the read command indicating address information; reading data to be read from a storage unit corresponding to the address information indicated by the read command; and if an error occurs in the data to be read, associating the address information indicated by the read command with a spare storage unit, and backing up the address information indicated by the read command and association information between the address information and the spare storage unit in a non-volatile storage unit based on a preset rule.

17 Claims, 6 Drawing Sheets

(51) Int. Cl.
  *G06F 3/06* (2006.01)
  *G06F 11/14* (2006.01)
  *G06F 11/07* (2006.01)

(52) U.S. Cl.
  CPC ........ *G06F 3/0679* (2013.01); *G06F 11/0727* (2013.01); *G06F 11/1448* (2013.01)

(56) References Cited

U.S. PATENT DOCUMENTS

| | | | |
|---|---|---|---|
| 6,023,434 | A | 2/2000 | Shore et al. |
| 8,015,433 | B2 | 9/2011 | Chu et al. |
| 8,412,987 | B2 | 4/2013 | Billing et al. |
| 8,914,700 | B2 | 12/2014 | Cheng et al. |
| 9,037,928 | B2 | 5/2015 | Kleveland et al. |
| 9,741,455 | B1 | 8/2017 | Park |
| 10,310,772 | B2 | 6/2019 | Zhou |
| 10,496,474 | B2 | 12/2019 | Kaminaga |
| 10,643,668 | B1 | 5/2020 | Poudyal et al. |
| 11,232,848 | B2 | 1/2022 | Bacchus |
| 11,527,301 | B2 | 12/2022 | Ning et al. |
| 2002/0097613 | A1 | 7/2002 | Raynham |
| 2002/0169996 | A1 | 11/2002 | King et al. |
| 2003/0133336 | A1 | 7/2003 | Chen |
| 2003/0156469 | A1 | 8/2003 | Viehmann et al. |
| 2004/0003315 | A1 | 1/2004 | Akhani et al. |
| 2004/0196707 | A1 | 10/2004 | Yoon et al. |
| 2005/0022839 | A1 | 2/2005 | Savas et al. |
| 2007/0294570 | A1 | 12/2007 | Polisetti et al. |
| 2008/0181035 | A1 | 7/2008 | Kawasumi |
| 2010/0229033 | A1 | 9/2010 | Maeda et al. |
| 2010/0269000 | A1 | 10/2010 | Lee |
| 2010/0332895 | A1 | 12/2010 | Billing et al. |
| 2010/0332950 | A1 | 12/2010 | Billing et al. |
| 2011/0121294 | A1 | 5/2011 | Koyama et al. |
| 2011/0189858 | A1 | 8/2011 | Yasseri et al. |
| 2012/0166710 | A1 | 6/2012 | Ou |
| 2012/0254511 | A1 | 10/2012 | Yeh |
| 2013/0179724 | A1 | 7/2013 | Cordero et al. |
| 2014/0075265 | A1 | 3/2014 | Hung et al. |
| 2014/0376320 | A1* | 12/2014 | Loh ................ G11C 29/76 365/200 |
| 2015/0019804 | A1 | 1/2015 | Nemazie et al. |
| 2015/0127972 | A1 | 5/2015 | Chun et al. |
| 2015/0143198 | A1 | 5/2015 | Chun et al. |
| 2015/0186198 | A1 | 7/2015 | Dong et al. |
| 2015/0293809 | A1 | 10/2015 | Liang |
| 2015/0347254 | A1 | 12/2015 | Jones et al. |
| 2015/0363425 | A1 | 12/2015 | Li et al. |
| 2016/0147599 | A1 | 5/2016 | Kim |
| 2016/0357462 | A1 | 12/2016 | Nam et al. |
| 2016/0364153 | A1 | 12/2016 | Nam et al. |
| 2017/0123879 | A1 | 5/2017 | Donlin |
| 2017/0132075 | A1 | 5/2017 | Zastrow |
| 2017/0139839 | A1 | 5/2017 | Ke |
| 2017/0186620 | A1 | 6/2017 | Marumoto et al. |
| 2017/0262178 | A1 | 9/2017 | Hashimoto |
| 2017/0308433 | A1 | 10/2017 | Kwon et al. |
| 2017/0372799 | A1 | 12/2017 | Bacchus |
| 2018/0052732 | A1 | 2/2018 | Jo et al. |
| 2018/0076022 | A1 | 3/2018 | Choi et al. |
| 2018/0158535 | A1 | 6/2018 | Kim et al. |
| 2019/0129776 | A1 | 5/2019 | Hsiao |
| 2019/0371391 | A1 | 12/2019 | Cha et al. |
| 2019/0377631 | A1 | 12/2019 | Hattori |
| 2019/0385693 | A1 | 12/2019 | Shin et al. |
| 2020/0004652 | A1 | 1/2020 | Niu et al. |
| 2020/0176053 | A1 | 6/2020 | Lin et al. |
| 2021/0055981 | A1 | 2/2021 | Miller et al. |
| 2021/0311836 | A1 | 10/2021 | Ning et al. |

FOREIGN PATENT DOCUMENTS

| | | |
|---|---|---|
| CN | 101908023 A | 12/2010 |
| CN | 102200937 A | 9/2011 |
| CN | 102592680 A | 7/2012 |
| CN | 103269230 A | 8/2013 |
| CN | 103309775 A | 9/2013 |
| CN | 103778065 A | 5/2014 |
| CN | 103839591 A | 6/2014 |
| CN | 103955430 A | 7/2014 |
| CN | 103955431 A | 7/2014 |
| CN | 104063186 A | 9/2014 |
| CN | 105740163 A | 7/2016 |
| CN | 105788648 A | 7/2016 |
| CN | 105868122 A | 8/2016 |
| CN | 105893178 A | 8/2016 |
| CN | 106229288 A | 12/2016 |
| CN | 106569742 A | 4/2017 |
| CN | 107247563 A | 10/2017 |
| CN | 109697022 A | 4/2019 |
| EP | 3951837 A1 | 2/2022 |
| IN | 103019873 A | 4/2013 |
| TW | 201706842 A | 2/2017 |

OTHER PUBLICATIONS

Extended European Search Report in U.S. Appl. No. 21/816,301, dated Jul. 6, 2022.
Extended European Search Report in U.S. Appl. No. 20/928,575, dated Jul. 4, 2022.
Extended European Search Report in U.S. Appl. No. 20/928,300, dated Jul. 19, 2022.
Extended European Search Report in U.S. Appl. No. 20/928,031, dated Jun. 2, 2022.
Extended European Search Report in U.S. Appl. No. 20/926,376, dated Jun. 13, 2022.
International Search Report in Application No. PCT/CN2020/130391, dated Jan. 20, 2021.
International Search Report in Application No. PCT/CN2020/130388, dated Feb. 23, 2021.
International Search Report in Application No. PCT/CN2020/130389, dated Feb. 24, 2021.
International Search Report in Application No. PCT/CN2020/130390, dated Feb. 24, 2021.
International Search Report in Application No. PCT/CN2020/127508, dated Feb. 18, 2021.
International Search Report in Application No. PCT/CN2020/127531, dated Feb. 7, 2021.
International Search Report in Application No. PCT/CN2020/127584, dated Feb. 18, 2021.
International Search Report in Application No. PCT/CN2020/127978, dated Feb. 10, 2021.
Extended European Search Report in Application No. 20929096.4, dated Sep. 28, 2022.
Extended European Search Report in Application No. 20928574.1, dated Oct. 11, 2022.
USPTO Non-Final Office Action in U.S. Appl. No. 17/342,492, dated Apr. 26, 2022.
Extended European Search Report in Application No. 20929597.1, dated Oct. 11, 2022.
U.S. non-final office action in U.S. Appl. No. 17/396,692, dated Jul. 7, 2023.
CN first office action in application No. 202010249662.8, dated May 27, 2023.
European Patent Office in application No. 20929096.4, dated May 15, 2023.
Extended European Search Report in application No. 20926358.1, dated Jul. 17, 2023.
CN first office action in application No. 202010250008.9, dated Jul. 1, 2023.
U.S. non-final office action in U.S. Appl. No. 17/353,824, dated Jul. 20, 2023.
U.S. non-final office action in U.S. Appl. No. 17/342,498, dated Jul. 19, 2023.
European patent office oral proceedings in application No. 20928575.8, dated Jun. 1, 2023.
Non-Final OA1 for U.S. Appl. No. 17/310,495, dated Jul. 31, 2023.
U.S. office action in U.S. Appl. No. 17/396,692, dated Jul. 7, 2023.

(56) References Cited

OTHER PUBLICATIONS

U.S. office action in U.S. Appl. No. 17/363,013, dated Aug. 3, 2023.
U.S. office action in U.S. Appl. No. 17/347,525, dated Aug. 2, 2023.
U.S. office action in U.S. Appl. No. 17/310,495, dated Jul. 31, 2023.
U.S. office action in U.S. Appl. No. 17/846,009, dated Jul. 31, 2023.
U.S. office action in U.S. Appl. No. 17/846,009, dated Aug. 28, 2023.
European Office Action in Application No. 20928300.1, dated Nov. 15, 2023.

* cited by examiner

READ AND WRITE METHODS AND MEMORY DEVICES

CROSS-REFERENCE TO RELATED APPLICATIONS

This application is a National Stage of International Application No. PCT/CN2020/130391 filed on Nov. 20, 2020, which claims priority to Chinese Patent Application No. 202010250023.3 filed on Apr. 1, 2020. The disclosures of these applications are hereby incorporated by reference in their entirety.

TECHNICAL FIELD

The present disclosure relates to the field of semiconductor storage, in particular to a read and write method and a memory device.

BACKGROUND

Semiconductor memory is a memory component used to store various data and information. With the increase in circuit complexity, it is inevitable to have defective or damaged storage units during the manufacturing or use of various memory devices, resulting in reduction in both reliability and service life of the semiconductor memory devices.

Therefore, how to improve the reliability of the memory devices and prolong the service life of the memory devices has become an urgent problem to be solved at present.

SUMMARY

The technical problem to be solved by the present disclosure is to provide a read and write method and a memory device, which can greatly improve the reliability of the memory device and prolong the service life of the memory device.

The present disclosure provides a read and write method, comprising: applying a read command to a memory device, the read command indicating address information; reading data to be read from a storage unit corresponding to the address information indicated by the read command; and if an error occurs in the data to be read, associating the address information indicated by the read command with a spare storage unit, and backing up the address information indicated by the read command and association information between the address information and the spare storage unit in a non-volatile storage unit based on a preset rule.

Further, the preset rule is a preset period or a preset action.

Further, the read and write method further comprises: after the memory device is started, loading the address information and the association information between the address information and the spare storage unit from the non-volatile storage unit.

Further, the read and write method further comprises: generating an identification code for identifying the spare storage unit, the address information indicated by the read command being associated with the spare storage unit by the identification code.

Further, the read and write method further comprises: if an error occurs in the data to be read, marking the address information indicated by the read command as invalid and backing up the invalid mark in the non-volatile storage unit based on the preset rule, and loading the invalid mark from the non-volatile storage unit after the memory device is started.

Further, if no error occurs in the data to be read, marking the address information indicated by the read command as valid and backing up the valid mark in the non-volatile storage unit based on the preset rule, and loading the valid mark from the non-volatile storage unit after the memory device is started.

Further, address information that is not marked as invalid is initially set as valid and the valid mark is backed up in the non-volatile storage unit based on the preset rule, and after the memory device is started, the valid mark is loaded from the non-volatile storage unit.

Further, reading data to be read from the storage unit corresponding to address information indicated by the read command further comprises: reading, from a storage unit corresponding to the address information indicated by the read command, a first ECC corresponding to the data to be read; and if an error occurs in the data to be read is determined by: decoding the first ECC to determine whether an error occurs in the data to be read.

Further, a lookup table is provided, the address information of the storage unit and a numerical code corresponding to the address information are recorded in the lookup table, the numerical code being composed of a first type code and a second type code, the first type code being used to mark whether the address information is valid, the second type code being used to record an identification code for the spare storage unit; and if an error occurs in the data to be read, then in the lookup table, the first type code of the numerical code corresponding to the address information indicated by the read command is modified to an invalid mark value, and the second type code is modified to the identification code for identifying a spare storage unit.

Further, the read and write method further comprises: recording a number of times of modification of the second type code, and generating a corresponding identification code according to the number of times of modification.

Further, the numerical code has an initial value, the first type code is a valid mark value and the second type code is a meaningless code in the initial value.

Further, a write command is applied to the memory device; if address information indicated by the write command is marked as valid, a write operation is executed on a storage unit corresponding to the address information indicated by the write command; and if the address information indicated by the write command is marked as invalid, the execution of the write operation on the storage unit corresponding to the address information indicated by the write command is stopped, and a write operation is executed on a spare storage unit identified by the identification code corresponding to the address information indicated by the write command.

Further, when the write command is applied to the memory device, the address information indicated by the write command is used as an index to search the numerical code in the lookup table.

Further, executing the write operation on the storage unit corresponding to the address information indicated by the write command further comprises: forming a second ECC corresponding to data to be written in the write operation, and writing the second ECC, together with the data to be written, into the storage unit corresponding to the address information indicated by the write command.

Further, after applying the read command to the memory device and before reading data to be read from the storage unit corresponding to the address information indicated by the read command, further comprising: determining whether the address information indicated by the read command is valid; if the address information indicated by the read command is valid, executing a read operation on the storage unit corresponding to the address information indicated by the read command; and if the address information indicated by the read command is invalid, stopping the execution of the read operation on the storage unit corresponding to the address information indicated by the read command, and executing a read operation on the spare storage unit identified by the identification code corresponding to the address information indicated by the read command.

Further, the read and write method further comprises: in a case where an error occurs in the data to be read, if the data to be read is corrected, storing the corrected data in the spare storage unit; and if the data to be read is not corrected, storing the data to be read in the spare storage unit.

The present disclosure further provides a memory device, comprising: a command receiving unit, configured to receive a read command or a write command;

a storage unit, configured to correspond to address information corresponding to the read command or the write command;

a spare storage unit;

an association unit, configured to record the address information and association information between the address information and the spare storage unit;

an execution unit, configured to execute a read operation or a write operation on the storage unit or the spare storage unit; and a non-volatile storage unit, configured to back up the address information and the association information between the address information and the spare storage unit recorded by the association unit based on a preset rule.

Further, the memory device further comprises: an identification code generation unit, connected to the association unit and configured to generate an identification code for identifying the spare storage unit, the association unit associates the address information with the spare storage unit by the identification code.

Further, the association unit is further configured to record mark information, the mark information recording whether the address information is valid or invalid.

Further, the association unit is a lookup table, address information of the storage unit and a numerical code corresponding to the address information are recorded in the lookup table, the numerical code being composed of a first type code and a second type code, the first type code being used to mark whether the address information is valid, the second type code being used to record an identification code for the spare storage unit; and if an error occurs in the data to be read, then in the lookup table, the first type code of the numerical code corresponding to the address information indicated by the read command is modified to an invalid mark value, and the second type code is modified to an identification code for identifying the spare storage unit.

Further, the memory device further comprises: a loading unit, connected to the association unit and the non-volatile storage unit and configured to load the address information and the mark information backed up in the non-volatile storage unit into the association unit.

Further, the memory device further comprises: an ECC coding and decoding unit, configured to decode a first ECC corresponding to the data to be read in the read operation and to form a second ECC corresponding to the data to be written in the write operation.

Further, the memory device comprises: a logic layer and at least one storage layer; the command receiving unit, the association unit, and the execution unit are arranged in the logic layer; the storage unit is arranged in the storage layer; the spare storage unit is arranged in the storage layer or the logic layer; and the non-volatile storage unit is arranged in the storage layer or the logic layer.

The advantage of the present disclosure is that, when the user executes read and write operations on the memory device, a storage unit with data errors is distinguished in real time and replaced with a spare storage unit, so that the user can perform read and write operations on the spare storage unit when performing read and write operations on the memory device subsequently, instead of performing read and write operations on the storage unit with data errors. It can greatly improve the reliability of the memory device and prolong the service life of the memory device. Meanwhile, the read and write method of the present disclosure also backs up the address information indicated by the read command and the association information between the address information and the spare storage unit in the non-volatile storage unit according to a preset rule. After the memory device is powered on again, the address information and its association information with the spare storage unit are loaded from the non-volatile storage unit. The association information is used as the initial association information of the address information with the spare storage unit in the subsequent read and write operations. Therefore, it can avoid re-associating the address information, which has been associated with the spare storage unit, with the spare storage unit after the memory device is powered on again, which greatly improves the operating speed of the memory device.

DETAILED DESCRIPTION

The specific implementations of the read and write method and the memory device according to the present disclosure will be described in detail below with reference to the accompanying drawings.

A common method to improve the reliability of the memory device is to encode data into error correction code (ECC) before the data is written into the memory device, and store both the data and the ECC in the memory device. In the read operation, both the data and the ECC are read, and the ECC is decoded to restore the data that may have errors.

However, it was found that the ECC can only correct the data when the data is read and the storage unit with data errors in the memory still exists. If, in the subsequent data storage process, at least one storage unit with data errors occurs in a storage segment corresponding to the above storage unit with data errors, there will be at least two storage units with data errors in this storage segment. The ECC will not be able to correct the at least two data errors above, which will cause the storage segment to be unusable, or even cause the memory device to be unusable, thereby affecting the reliability and service life of the memory device.

It was found that, when the memory device is in use, if a storage unit with data errors can be distinguished in real time and replaced with a spare storage unit, the execution of read and write operations on the storage unit with data errors (that is, the failed storage unit) can be avoided, thereby greatly improving the reliability of the memory device and prolonging the service life of the memory device. Therefore, the present disclosure provides a read and write method which can distinguish a storage unit with data errors in real time and replace the storage unit with data errors with a spare storage unit, and also can back up the address information and its association information with the spare storage unit in a non-volatile storage unit based on a preset rule.

Figure 1:
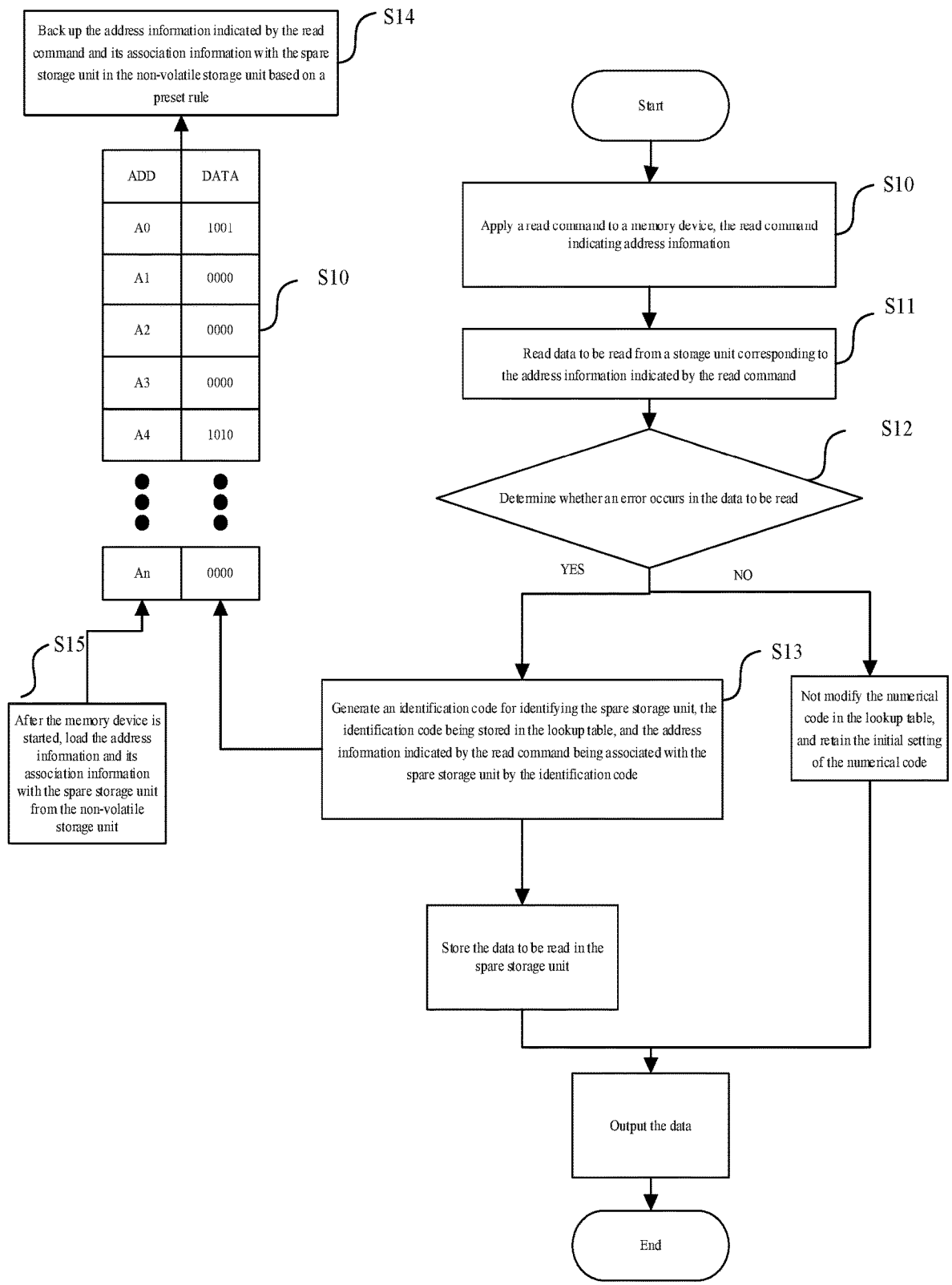
FIG. 1 is a schematic flowchart of a first specific implementation of a read and write method according to the present disclosure.

In the first specific implementation of the read and write method according to the present disclosure, when a read operation is performed, a storage unit with an error in the data to be read is distinguished in real time and replaced with a spare storage unit. Specifically, referring to FIG. 1, a schematic flowchart of the first specific implementation of the read and write method according to the present disclosure is shown. The read and write method comprises the following steps:

S10: A read command is applied to a memory device, the read command indicating address information. For example, the address information indicated by the read command is A0.

S11: Data to be read is read from a storage unit corresponding to the address information indicated by the read command. For example, the data to be read is read from a storage unit corresponding to the address information A0.

S12: It is determined whether an error occurs in the data to be read.

If an error occurs in the data to be read, it is indicated that the storage unit is failed, the address information indicated by the read command is associated with a spare storage unit, and the data to be read is stored in the spare storage unit. That is, the failed storage unit is replaced with a spare storage unit, to improve the reliability of the memory device. Further, in another specific implementation of the present disclosure, in a case where an error occurs in the data to be read, if the data to be read is corrected, the corrected data of the data to be read is stored in the spare storage unit.

Further, in order to associate the address information indicated by the read command with the spare storage unit, in this specific embodiment, the read and write method further comprises a step S13: generating an identification code for identifying the spare storage unit. The identification code is stored in the lookup table 10, and the address information indicated by the read command is associated with the spare storage unit by the identification code. It may be understood that the identification codes corresponding to different spare storage units are different, to ensure that the spare storage units associated with the address information indicated by the read command will not be repeated, thereby avoiding data storage errors.

In this specific embodiment, a lookup table 10 is provided, the lookup table 10 having an address information column ADD and a numerical value column DATA.

The address information column ADD is pre-stored with all pieces of address information of the memory device, for example A0, A1, A2, A3, A4, A5, A6 . . . An, and the number of pieces of address information may be set based on the actual configuration of the memory device.

The numerical value column DATA is used to store a numerical code corresponding to the address information. Wherein, each piece of address information corresponds to a numerical code. The numerical code comprises at least an identification code for identifying the spare storage unit or a meaningless code.

In this specific embodiment, the numerical code is composed of a first type code and a second type code.

The first type code is used to mark whether the address information is valid. For example, the first type code is 0 or 1, 0 is a valid mark value indicating that the address information is valid, and 1 is an invalid mark value indicating that the address information is invalid.

Specifically, if an error occurs in the data to be read, it is indicated that the storage unit is invalid, and the address information indicated by the read command is marked as invalid. For example, if an error occurs in the data to be read which is read from a storage unit corresponding to the address information A0 indicated by the read command, then in the lookup table 10, the first type code of the numerical code corresponding to the address information A0 indicated by the read command is marked as an invalid mark value of 1; and if an error occurs in the data to be read which is read from a storage unit corresponding to the address information A4 indicated by the read command, then in the lookup table 10, the first type code of the numerical code corresponding to the address information A4 indicated by the read command is marked as an invalid mark value of 1.

The second type code is used to record the identification code or meaningless code. The second type code may have multiple bits, which may be determined according to the number of spare storage units. For example, the second type code has three bits, which may be 000, 001, 010, 100, 101, 011, 110, 111, etc.

Wherein, when the first type code is an invalid mark value indicating that the address information is invalid (for example, when the first type code is 1), the second type code is the identification code, the address information indicated by the read command is associated with the spare storage unit by the identification code, and the data to be read is stored in the spare storage unit. For example, if the first type code of the numerical code corresponding to the address information A0 is the invalid mark value 1, the second type code 001 of the numerical code corresponding to the address information A0 is an identification code that can identify a spare storage unit, the address information indicated by the read command is associated with the spare storage unit by the identification code 001, and the data to be read is stored in the spare storage unit identified by the identification code 001; and if the first type code of the numerical code corresponding to the address information A4 is the invalid mark value 1, the second type code 010 of the numerical code corresponding to the address information A4 is an identification code that can identify a spare storage unit, and the address information indicated by the read command is associated with the spare storage unit by the identification code 010, and the data to be read is stored in the spare storage unit identified by the identification code 010.

If no error occurs in the data to be read, it is indicated that the storage unit is valid. Then, in the lookup table 10, the first type code of the numerical code corresponding to the address information indicated by the read command is a valid mark value, and the second type code is a meaningless code. The meaningless code is simply used to fill digits, not for identifying any spare storage unit.

Specifically, in this specific implementation, if no error occurs in the data to be read which is read from the storage unit corresponding to the address information A1 indicated by the read command, then in the lookup table 10, the first type code of the numerical code corresponding to the address information A1 indicated by the read command is marked as a valid mark value of 0, and the second type code is a meaningless code 000; and if no error occurs in the data to be read which is read from a storage unit corresponding to the address information A2 indicated by the read command, then in the lookup table 10, the first type code of the numerical code corresponding to the address information A2 indicated by the read command is marked as a valid mark value of 0, and the second type code is a meaningless code 000. In this specific implementation, the numerical value 000 represents the meaningless code. In other specific implementations of the present disclosure, other numerical values may be set to represent the meaningless code.

In the present disclosure, there are two processing methods for setting the first type code of the numerical code corresponding to the address information indicated by the read command as a valid mark value:

The first processing method for setting the first type code of the numerical code corresponding to the address information indicated by the read command as a valid mark value is to, in the lookup table, initially set the numerical codes corresponding to all pieces of address information as a combination of a valid mark value and a meaningless code. In this case, if no error occurs in the data to be read, the numerical code in the lookup table is not modified, that is, the initial setting of the numerical code is retained. For example, if no error occurs in the data to be read which is read from the storage unit corresponding to the address information A1 indicated by the read command, then in the lookup table 10, the numerical code corresponding to the address information A1 indicated by the read command is retained as the initial setting, that is, the initial setting of the numerical code is not modified. In this specific implementation, this processing method is adopted.

For the first processing method, only when an error occurs in the data to be read which is read from the storage unit corresponding to the address information indicated by the read command, then in the lookup table 10, the first type code of the numerical code corresponding to the address information indicated by the read command is modified from a valid mark value to an invalid mark value, and the second type code of the numerical code is modified from a meaningless code to an identification code. For example, if an error occurs in the data to be read which is read from the storage unit corresponding to the address information A0 indicated by the read command, then in the lookup table 10, the first type code of the numerical code corresponding to the address information A0 indicated by the read command is modified from a valid mark value to an invalid mark value, and the second type code of the numerical code is modified from a meaningless code to an identification code.

Further, in the first processing method, when the memory device is powered on or delivered, in the lookup table, the numerical codes corresponding to all pieces of address information are initially set as a combination of a valid mark value and a meaningless code. It may be understood that, with the use of the memory device, after performing read and write operations on the memory device multiple times, in the lookup table, the numerical code corresponding to the address information may be a combination of an invalid mark value and an identification code or a combination of a valid mark value and a meaningless code. Therefore, when a read command is applied to the memory device, the lookup table obtained after the previous read and write operation is the initial lookup table for the current read operation. The initial lookup table records the numerical code corresponding to the address information of the storage unit after the previous read and write operation. The numerical code is the initial numerical code for the current read operation. The numerical code may be a combination of an invalid mark value and an identification code, or a combination of a valid mark value and a meaningless code. If an error occurs in the data to be read, then in the lookup table 10, the numerical code of the address information indicated by the read command is modified to a combination of an invalid mark value and an identification code.

Further, the read and write method according to the present disclosure further comprises: recording the number of times of modification of the second type code, and generating a corresponding identification code according to the number of times of modification. Specifically, if a data error occurs in the address information indicated by the read command, the second type code needs to be modified as an identification code, so as to associate the address information with a spare storage unit by the identification code. In order to avoid repeated spare storage units associated with different address information, different identification codes may be generated according to the number of times of modification of the second type code. That is, identification codes corresponding to different address information are different. In this way, different address information is associated with different spare storage units. For example, when the number of times of modification of the second type code is 0, the identification code is 001; when the number of times of modification of the second type code is 1, the identification code is 010; and when the number of times of modification of the second type code is 2, the identification code is 100 . . . ; and so on. A corresponding identification code is generated according to the number of times of modification.

The second processing method for setting the first type code of the numerical code corresponding to the address information indicated by the read command as a valid mark value is to, if no error occurs in the data to be read, in the lookup table 10, mark the first type code of the numerical code corresponding to the address information indicated by the read command as a valid mark value, and fill the second type code with a meaningless code. For example, if no error occurs in the data to be read which is read from the storage unit corresponding to the address information A1 indicated by the read command, then in the lookup table 10, the first type code of the numerical code corresponding to the address information A1 indicated by the read command is marked as a valid mark value of 0, and the second type code is filled with a meaningless code.

In another specific implementation of the present disclosure, the numerical code may be composed of only the second type code, that is, the numerical code comprises only an identification code for identifying a spare storage unit or a meaningless code. If an error occurs in the data to be read, it is indicated that the storage unit is failed, and the numerical code corresponding to the address information for the storage unit is an identification code. If no error occurs in the data to be read, the storage unit is valid. The numerical code corresponding to the address information for the storage unit is a meaningless code.

The read and write method according to the present disclosure further comprises a step S14: backing up the address information indicated by the read command and its association information with the spare storage unit in the non-volatile storage unit based on a preset rule. Specifically, in this specific embodiment, the lookup table 10 is backed up in the non-volatile storage unit based on a preset rule.

Wherein, the preset rule may be a preset period or a preset action.

The preset period may be a preset time period after the memory device is powered on. For example, after the memory device is powered on, the address information indicated by the read command and its association information with the spare storage unit are backed up in the non-volatile storage unit periodically, with the period being ten minutes, that is, after the memory device is powered on, the address information indicated by the read command and its association information with the spare storage unit are backed up in the non-volatile storage unit every ten minutes; or, the address information indicated by the read command and its association information with the spare storage unit are backed up in the non-volatile storage unit periodically, with the period being one hour, that is, after the memory device is powered on, the address information indicated by the read command and its association information with the spare storage unit are backed up in the non-volatile storage unit every one hour.

The preset action may be an operation received by the memory device. Such an operation received by the memory device is, for example, an operation of closing the memory device and an operation of restarting the memory device, and a trigger operation, which is set by the user or the system and which contains the backup of the address information and the marking instruction, etc. Wherein, the trigger operation may be any operation of issuing a trigger instruction, for example, an operation of clicking a certain trigger button, or an operation of closing a certain trigger button by the user. It is not limited in the present disclosure.

The read and write method according to the present disclosure backs up the address information and its association information with the spare storage unit in the non-volatile storage unit. If the memory device is powered down, the address information and its association information with the spare storage unit will still be recorded in the non-volatile storage unit and will not be cleared, and may be used as a basis for subsequent read and write operations. In this specific implementation, the lookup table 10 is backed up in the non-volatile storage unit. That is, the address information and its corresponding numerical code, recorded in the lookup table 10, are backed up in the non-volatile storage unit.

Further, the read and write method further comprises a step S15: after the memory device is started (that is, the memory device is powered on again), loading the address information and its association information with the spare storage unit from the non-volatile storage unit. Specifically, in this specific implementation, after the memory device is started (that is, the memory device is powered on again), the lookup table 10 is loaded from the non-volatile storage unit. The numerical code corresponding to the address information recorded in the lookup table 10 is used as the initial numerical code for subsequent read and write operations, thereby avoiding re-modification of the modified numerical code after the memory device is powered on again, and avoiding the re-association of the failed storage unit with the spare storage unit, which greatly improves the operating speed of the memory device.

Further, the present disclosure further provides a method for determining whether an error occurs in the data to be read. Specifically, the step of reading data to be read from the storage unit corresponding to address information indicated by the read command further comprises: reading, from the storage unit corresponding to the address information indicated by the read command, a first ECC corresponding to the data to be read. For example, the number of bits of data read from the storage unit corresponding to the address information indicated by the read command is 64b+8b, where 64b is the number of bits of the data to be read, and 8b is the number of bits of the first ECC. According to a corresponding algorithm, the first ECC is decoded to restore the data that may have errors. The algorithm is well known and will not be repeated here. Therefore, it may be determined whether an error occurs in the data to be read based on the decoding of the first ECC.

The present disclosure lists a method for determining whether an error occurs in the data to be read based on the decoding of the first ECC: re-encoding the data to be read, to form a new ECC; comparing the new ECC with the first ECC by bit-wise XOR comparison; if all bits are consistent indicating that no error occurs in the data to be read and the storage unit is valid, not modifying the lookup table 10, wherein the first type code of the numerical code corresponding to the address information for the storage unit is a valid mark value; and if the new ECC is inconsistent with the first ECC indicating that an error occurs in the data to be read and the storage unit is failed, modifying, in the lookup table 10, the first type code of the numerical code corresponding to the address information indicated by the read command to an invalid mark value.

Wherein, if no error occurs in the data to be read, the data to be read is used as the output data of the memory device; and if an error occurs in the data to be read, the data to be read is corrected by the first ECC, the corrected data is used as the output data of the memory device, and the corrected data is stored in the corresponding spare storage unit.

By the read and write method according to the present disclosure, a storage unit with data errors can be distinguished in real time when the user performs read and write operations on the memory device, and replaced with a spare storage unit. That is, every time a read operation is performed, a storage unit with data errors will be replaced with a spare storage unit, so that the user can perform read and write operations on the spare storage unit when performing read and write operations on the memory device subsequently, instead of performing read and write operations on the storage unit with data errors. It can greatly improve the reliability of the memory device and prolong the service life of the memory device.

Meanwhile, the read and write method of the present disclosure also backs up the address information indicated by the read command and its association information with the spare storage unit in the non-volatile storage unit according to a preset rule. After the memory device is powered on again, the address information and its association information with the spare storage unit are loaded from the non-volatile storage unit. The association information is used as the initial association information of the address information with the spare storage unit in the subsequent read and write operations. Therefore, it can avoid re-associating the address information, which has been associated with the spare storage unit, with the spare storage unit after the memory device is powered on again, which greatly improves the operating speed of the memory device.

Figure 2:
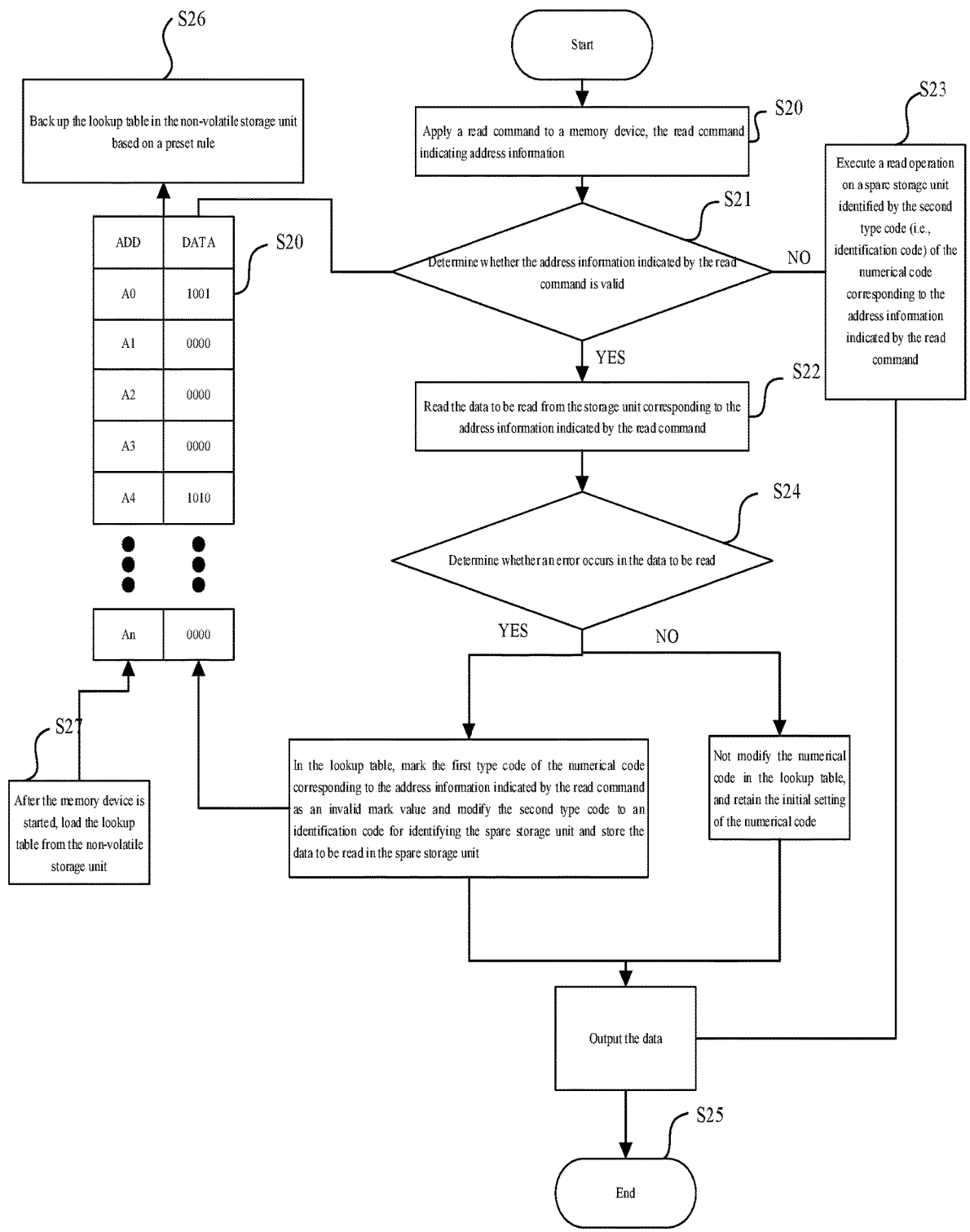
FIG. 2 is a schematic flowchart of a second specific embodiment of the read and write method according to the present disclosure.

The read and write method according to the present disclosure further provides a second specific implementation. After the step of applying a read command on the memory device and before the step of reading data to be read from the storage unit corresponding to the address information indicated by the read command, the read and write method further comprises: determining whether the address information indicated by the read command is valid. Specifically, referring to FIG. 2, a schematic flowchart of the second implementation of the read and write method according to the present disclosure is shown.

S20: A read command is applied to a memory device, the read command indicating address information.

S21: determining whether the address information indicated by the read command is valid.

Specifically, when a read command is applied to a memory device, the address information indicated by the read command is used as an index to search the mark in a lookup table 20. In the lookup table 20, if the first type code of the numerical code corresponding to the address information indicated by the read command is a valid mark value, it is indicated that the address information indicated by the read command is valid; and if the first type code of the numerical code corresponding to the address information indicated by the read command is an invalid mark value, it is indicated that the address information indicated by the read command is invalid.

For example, the address information indicated by the read command is A1, and the address information A1 indicated by the read command is used as an index to search the mark in the lookup table 20. In the lookup table 20, the first type code of the numerical code corresponding to the address information A1 indicated by the read command is a valid mark value of 0, which indicates that the address information A1 indicated by the read command is valid.

For another example, the address information indicated by the read command is A4. The address information A4 indicated by the read command is used as an index to search the mark in the lookup table 20. In the lookup table 20, the first type code of the numerical code corresponding to the address information A4 indicated by the read command is an invalid mark value of 1, which indicates that the address information A4 indicated by the read command is invalid.

If the address information indicated by the read command is valid, a read operation is executed on the storage unit corresponding to the address information indicated by the read command, that is, step S22 is executed. For example, in the lookup table 20, the first type code of the numerical code corresponding to the address information A1 indicated by the read command is a valid mark value of 0, which indicates that the storage unit corresponding to the address information A1 indicated by the read command is valid. Then, a read operation is executed on the storage unit corresponding to the address information A1 indicated by the read command, that is, step S22 is executed. In the step S22, the address information indicated by the read command is address information A1.

Further, if the first type code of the numerical code corresponding to the address information indicated by the read command is a valid mark value, the second type code of the numerical code is no longer identified.

If the address information indicated by the read command is invalid, that is, in the lookup table 20, the first type code of the numerical code corresponding to the address information indicated by the read command is an invalid mark value, which indicates that the storage unit corresponding to the address information indicated by the read command is failed, the execution of the read operation on the storage unit corresponding to the address information indicated by the read command is stopped, and step S23 is executed. For example, if, in the lookup table 20, the first type code of the numerical code corresponding to the address information A4 indicated by the read command is an invalid mark value of 1, the execution of the read operation on the storage unit corresponding to the address information indicated by the read command is stopped, and step S23 is executed.

Further, in another specific implementation of the present disclosure, the numerical code may be composed of only the second type code, that is, the numerical code comprises only an identification code for identifying a spare storage unit or a meaningless code. When a read command is applied to the memory device, the address information indicated by the read command is used as an index to search the numerical code in the lookup table 20. In the lookup table 20, if the numerical code corresponding to the address information indicated by the read command is a meaningless code, which indicates that the storage unit corresponding to the address information indicated by the read command is valid, a read operation is executed on the storage unit, that is, step S22 is executed; and if the numerical code corresponding to the address information indicated by the read command is an identification code, which indicates that the storage unit corresponding to the address information indicated by the read command is invalid, a read operation is executed on the spare storage unit corresponding to the identification code, that is, step S23 is executed.

S22: Data to be read is read from a storage unit corresponding to the address information indicated by the read command. For example, data to be read is read from a storage unit corresponding to the address information A1 indicated by the read command. This step is the same as step S11 in the first specific implementation.

S23: A read operation is executed on a spare storage unit identified by the second type code (i.e., identification code) of the numerical code corresponding to the address information indicated by the read command. For example, if, in the lookup table 20, the first type code of the numerical code corresponding to the address information A4 indicated by the read command is an invalid mark value of 1, a read operation is executed on a spare storage unit identified by the second type code 101 of the numerical code corresponding to the address information A4 indicated by the read command. S25 is executed after S23.

S24: It is determined whether an error occurs in the data to be read. This step is the same as step S12 in the first specific implementation. If an error occurs in the data to be read, then in the lookup table 20, the first type code of the numerical code corresponding to the address information indicated by the read command is marked as an invalid mark value and the second type code is modified to an identification code for identifying the spare storage unit, and the data to be read is stored in the spare storage unit; and if no error occurs in the data to be read, then in the lookup table 20, the first type code of the numerical code corresponding to the address information indicated by the read command is modified as a valid mark value and the second type code is filled with a meaningless code, or when the numerical codes in the lookup table 20 are initially set as a combination of a valid mark value and a meaningless code, the lookup table is not modified. In this specific implementation, the lookup table is not modified. Further, in another specific embodiment of the present disclosure, in a case where an error occurs in the data to be read, if the data to be read is corrected, the corrected data corresponding to the data to be read is stored in the spare storage unit.

S25: The data is output. In this step, the output data may be the data stored in the spare storage unit, and may be the data to be read, which has been modified or not, in the storage unit.

S26: The lookup table 20 is backed up in the non-volatile storage unit based on a preset rule. This step is the same as step S14, and the preset rule may be a preset period or a preset action.

S27: After the memory device is started, the lookup table 20 is loaded from the non-volatile storage unit. This step is the same as step S15. The numerical code corresponding to the address information recorded in the lookup table 20 is used as the initial numerical code for the read and write operations. Therefore, it can avoid re-associating the address information, which has been associated with the spare storage unit, with the spare storage unit after the memory device is powered on again, which greatly improves the operating speed of the memory device.

In the second specific implementation, after a read command is applied to the memory device, it is determined whether the address information indicated by the read command is valid, so that a read operation can be selectively executed on the address information indicated by the read command. Therefore, it can improve the reliability of the memory device. In addition, after the data to be read is read, the address information of the storage unit may be marked according to whether an error occurs in the data to be read, and in a case where an error occurs in the data to be read, the storage unit is replaced with a spare storage unit and the corrected data is stored in the spare storage unit to provide a basis for subsequent read and write operations, which greatly improves the reliability and service life of the memory device.

It should be noted that, in another specific implementation, after S23, it is also possible to continue to determine whether an error occurs in the data read from the corresponding spare storage unit, and if no error occurs in the data, the data is output; and if an error occurs in the data, the numerical value of the second type code corresponding to the address information indicated by the read command is modified, the address information is associated with another spare storage unit, and the corrected data to be read may be stored in the new spare storage unit.

Figure 3:
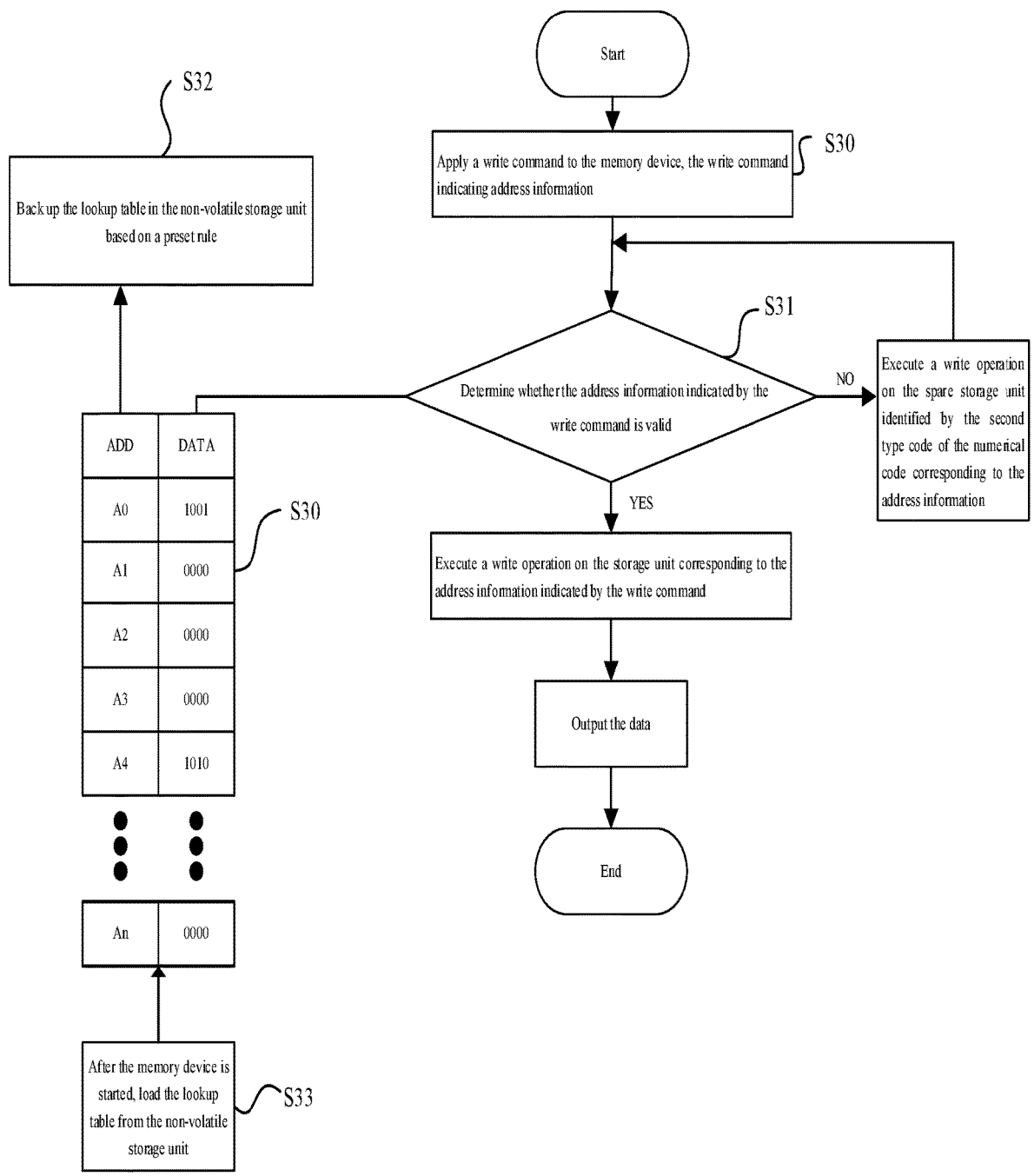
FIG. 3 is a schematic flowchart of a third specific embodiment of the read and write method according to the present disclosure.

The read and write method according to the present disclosure further provides a third specific implementation. The third embodiment involves a write operation to the memory device. Specifically, referring to FIG. 3, a schematic flowchart of the third implementation of the read and write method according to the present disclosure is shown.

S30: A write command is applied to the memory device, the write command indicating address information. For example, a write command is applied to the memory device, the write command indicating address information A0.

S31: It is determined whether the address information indicated by the write command is valid.

In this specific implementation, the address information indicated by the write command is used as an index to search the mark corresponding to the address information in the lookup table, in order to determine whether the address information indicated by the write command is valid according to the mark.

For example, if the address information indicated by the write command is A0, the address information A0 indicated by the write command is used as an index to search the first type code of the numerical code corresponding to the address information A0 in the lookup table 30, in order to determine whether the address information A0 indicated by the write command is valid according to the first type code; and if the address information indicated by the write command is A1, the address information A1 indicated by the write command is used as an index to search the first type code of the numerical code corresponding to the address information A1 in the lookup table 30, in order to determine whether the address information A1 indicated by the write command is valid according to the first type code.

If the address information indicated by the write command is marked as valid, a write operation is executed on the storage unit corresponding to the address information indicated by the write command; and if the first type code of the numerical code corresponding to the address information indicated by the write command is an invalid mark value, the execution of the write operation on the storage unit corresponding to the address information indicated by the write command is stopped, the second type code of the numerical code is identified, and a write operation is executed on the spare storage unit identified by the second type code.

For example, in the lookup table 30, the first type code of the numerical code corresponding to the address information A0 indicated by the write command is an invalid mark value of 1, then the execution of the write operation on the storage unit corresponding to the address information A0 indicated by the write command is stopped, the second type code 001 of the numerical code is identified, and a write operation is executed on the spare storage unit identified by the second type code 001; and in the lookup table, the first type code of the numerical code corresponding to the address information A1 indicated by the write command is a valid mark value of 0, then a write operation is executed on the storage unit corresponding to the address information A1 indicated by the write command.

S32: The lookup table 30 is backed up in the non-volatile storage unit based on a preset rule. This step is the same as step S14, and the preset rule may be a preset period or a preset action.

S33: After the memory device is started, the lookup table 30 is loaded from the non-volatile storage unit. This step is the same as step S15. The numerical code corresponding to the address information recorded in the lookup table 30 is used as the initial numerical code for the read and write operations. Therefore, it can avoid re-associating the address information, which has been associated with the spare storage unit, with the spare storage unit after the memory device is powered on again, which greatly improves the operating speed of the memory device.

Further, in another specific embodiment of the present disclosure, the numerical code may be composed of only the second type code, that is, the numerical code comprises only an identification code for identifying a spare storage unit or a meaningless code. When a write command is applied to the memory device, the address information indicated by the write command is used as an index to search the numerical code in the lookup table 30. In the lookup table 30, if the numerical code corresponding to the address information indicated by the write command is a meaningless code, which indicates that the storage unit corresponding to the address information indicated by the write command is valid, a write operation is executed on the storage unit; and if the numerical code corresponding to the address information indicated by the write command is an identification code, which indicates that the storage unit corresponding to the address information indicated by the write command is invalid, a write operation is executed on the spare storage unit corresponding to the identification code.

Further, in the third specific implementation, the read and write method further comprises: forming a second ECC corresponding to the data to be written in the write operation, and writing the second ECC, together with the data to be written, into the storage unit corresponding to the address information indicated by the write command. When the data in the storage unit is read, both the data and the second ECC are read, and the second ECC is decoded to restore the data that may have errors.

In the third specific implementation, the read and write method according to the present disclosure determines whether the address indicated by the write command is valid after applying the write command to the memory device; and if the address is invalid, a write operation is executed on the corresponding spare storage unit, which avoids executing a write operation on failed storage unit, thereby improving the reliability of the memory device and prolonging the service life of the memory device.

The present disclosure further provides a memory device capable of realizing the above-mentioned read and write method. The memory device comprises, but is not limited to, volatile memories such as DRAM and SRAM and non-volatile memories such as NAND, NOR, FeRAM, RRAM, MRAM and PCRAM.

Figure 4:
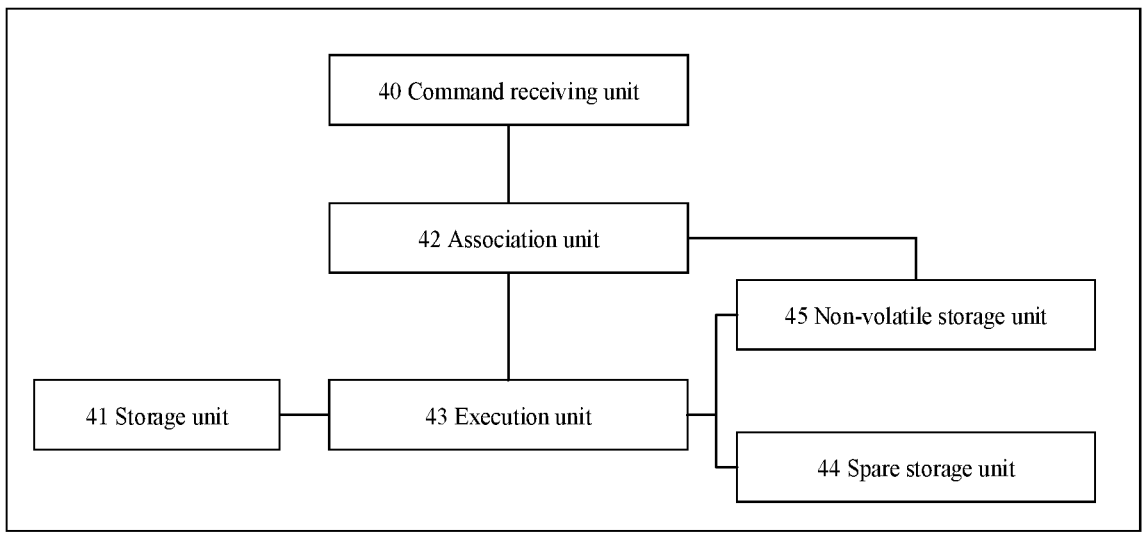
FIG. 4 is a schematic diagram of the framework of the first specific embodiment of a memory device according to the present disclosure.

Referring to FIG. 4, a schematic diagram of the framework of the first specific embodiment of a memory device according to the present disclosure is shown. The memory device comprises a command receiving unit 40, a storage unit 41, an association unit 42, an execution unit 43, a spare storage unit 44, and a non-volatile storage unit 45.

The command receiving unit 40 is configured to receive address information indicated by a read command, a write command, or a read/write command applied to the memory device.

The storage unit 41 corresponds to the address information corresponding to the read command or the write command, and is configured to store data. In the present disclosure, the storage unit 41 may be storage units well-known to those skilled in the art, such as a storage cell, a storage segment, storage pages, storage blocks, etc. This is not limited in the present disclosure.

The association unit 42 is configured to record the address information and its association information with the spare storage unit. In this specific implementation, the association unit 42 is also configured to store mark information, the mark information records that the address information is valid or invalid. Specifically, in this specific implementation, the association unit 42 is a lookup table. The lookup table records the address information of the storage unit 41 and the numerical code corresponding to the address information. The numerical code is composed of a first type code and a second type code, the first type code is configured to mark whether the address information is valid, and the second type code is configured to record an identification code for the spare storage unit 44. If an error occurs in the data to be read, the first type code of the numerical code corresponding to the address information indicated by the read command is modified to an invalid mark value in the lookup table, and the second type code is modified to an identification code for identifying the spare storage unit 44.

The execution unit 43 is configured to control the execution of a read operation or a write operation on the storage unit 41. The execution unit 43 is also connected to the association unit 42, and is configured to execute a read operation or a write operation on the storage unit 41 corresponding to the address information according to the record of the association unit 42, or stop the execution of the read operation or write operation on the storage unit 41 corresponding to the address information. Specifically, if the first type code of the numerical code corresponding to the address information indicated by the read command or the write command is a valid mark value, the execution unit 43 executes a read operation or a read operation on the storage unit corresponding to the address information; and if the first type code of the numerical code corresponding to the address information indicated by the read command or the write command is an invalid mark value, the execution unit 43 stops the execution of the read operation or read operation on the storage unit corresponding to the address information, and executes, according to the second type code of the numerical code, a read operation or a write operation on the spare storage unit identified by the second type code.

It should be noted that, in other specific implementations, the command receiving unit 40 may be directly connected to the execution unit 43, and the association unit 42 is connected to the execution unit 43 but not to the command receiving unit 40. The connection method is not limited in the present disclosure and may be set by a person of ordinary skill in the art as needed to realize the above-mentioned functions.

The spare storage unit 44 corresponds to the address information indicated by the read command or the write command through the second type code, and is configured to store data. In the present disclosure, the spare storage unit 44 may be storage units well-known to those skilled in the art, such as a storage cell, a storage segment, storage pages, storage blocks, etc. This is not limited in the present disclosure.

The non-volatile storage unit 45 is configured to back up the address information and its association information with the spare storage unit 44 based on a preset rule. Specifically, in this specific implementation, the lookup table is backed up in the non-volatile storage unit 45 based on a preset rule.

The non-volatile storage unit 45 may be non-volatile storage structures such as NAND, NOR, FeRAM, RRAM, MRAM, and PCRAM.

The non-volatile storage unit 45 is connected to the execution unit 43, and the execution unit 43 controls the address information and its association information with the spare storage unit to be backed up in the non-volatile storage unit 45 based on a preset rule. Wherein, the preset rule may be a preset period or a preset action. Further, when the preset action is a trigger action input by the user, the command receiving unit 40 can receive the trigger action, and the execution unit 43 can control the address information and its association information with the spare storage unit to be backed up in the non-volatile storage unit 45 according to the trigger action.

Further, the execution unit 43 can also control the address information and its association information with the spare storage unit backed up in the non-volatile storage unit 45 to be loaded into the association unit 42. For example, after the memory device is started, the execution unit 43 controls the address information and its association information with the spare storage unit backed up in the non-volatile storage unit 45 to be loaded into the association unit 42, as a basis for subsequent read and write operations. Therefore, it can avoid re-associating the address information, which has been associated with the spare storage unit, with the spare storage unit after the memory device is powered on again, which greatly improves the operating speed of the memory device.

Figure 5:
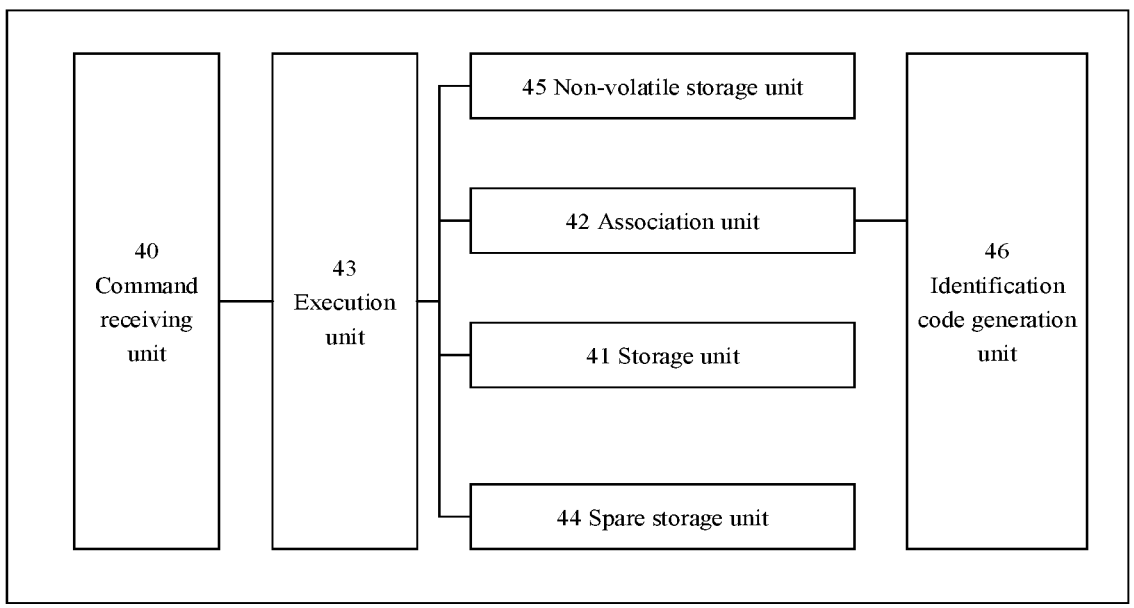
FIG. 5 is a schematic diagram of the framework of the second specific embodiment of the memory device according to the present disclosure.

Further, the memory device according to the present disclosure further provides a second specific implementation. Referring to FIG. 5, a schematic diagram of the framework of the second specific implementation of the memory device according to the present disclosure is shown. The difference between the second specific implementation and the first specific implementation is that the memory device according to the present disclosure further comprises an identification code generation unit 46. The identification code generation unit 46 is configured to generate an identification code for identifying the spare storage unit. The identification code generation unit 46 is connected to the association unit 42, and the association unit 42 can modify the second type code of the numerical code to the identification code generated by the identification code generation unit 46. Further, the identification code generation unit 46 can record the number of times of modification of the second type code of the numerical code in the association unit 42 so as to generate an identification code according to the number of times of modification.

The association unit 42 associates the address information with the spare storage unit 44 by the identification code, so that the execution unit 43 can execute a read operation or a write operation on the spare storage unit 44.

Figure 6:
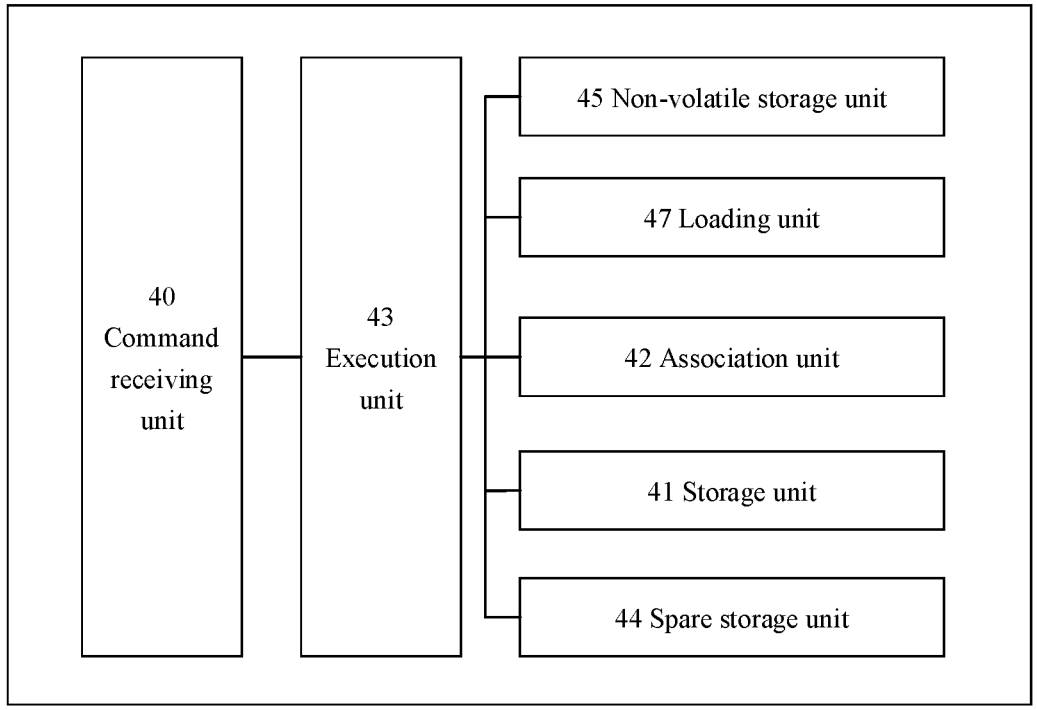
FIG. 6 is a schematic diagram of the framework of the third specific embodiment of a memory device according to the present disclosure.

Further, the memory device according to the present disclosure further provides a third specific implementation. Referring to FIG. 6, a schematic diagram of the framework of the third specific implementation of the memory device according to the present disclosure is shown. The difference between the third specific implementation and the first specific implementation is that the memory device according to the present disclosure further comprises a loading unit 47.

The loading unit 47 is connected to the association unit 42 and the non-volatile storage unit 45, and is configured to load the address information and its association with the spare storage unit backed up in the non-volatile storage unit 45 into the association unit 42. Further, the loading unit 47 is also connected to the execution unit 43, and the execution unit 43 controls the loading unit 47 to load the address information and its association with the spare storage unit backed up in the non-volatile storage unit 45 into the association unit 42. For example, after the memory device is started, the execution unit 43 controls the loading unit 47 to load the address information and its association information with the spare storage unit backed up in the non-volatile storage unit 45 into the association unit 42, as a basis for subsequent read and write operations. Therefore, it can avoid re-associating the address information, which has been associated with the spare storage unit, with the spare storage unit after the memory device is powered on again, which greatly improves the operating speed of the memory device.

Figure 7:
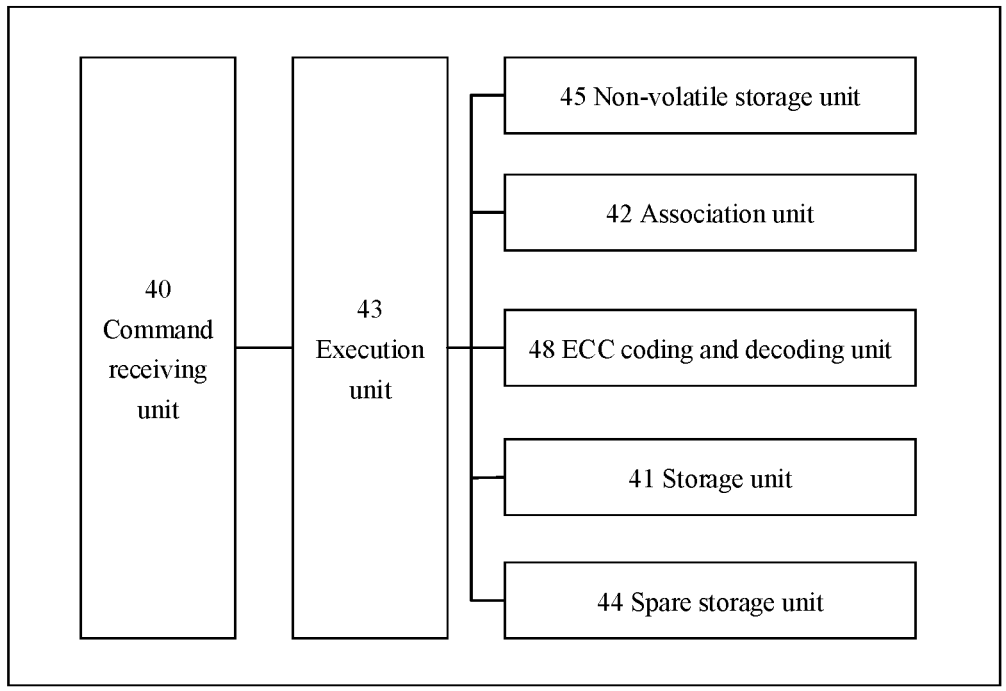
FIG. 7 is a schematic diagram of the framework of the fourth specific embodiment of a memory device according to the present disclosure.

Further, the memory device according to the present disclosure further provides a fourth specific implementation. Referring to FIG. 7, a schematic diagram of the framework of the fourth specific implementation of the memory device according to the present disclosure is shown. The difference between the fourth specific implementation and the first specific implementation is that the memory device according to the present disclosure further comprises an ECC coding and decoding unit 48.

The ECC coding and decoding unit 48 is connected to the execution unit 43, the storage unit 41, and the association unit 42.

The ECC coding and decoding unit 48 is configured to decode the first ECC corresponding to the data to be read in the read operation to restore the data that may have errors, and may be configured to modify the numerical code in the association unit 42 according to whether the ECC coding and decoding unit 48 restores the data. The ECC coding and decoding unit 48 is further configured to form a second ECC corresponding to the data to be written in the write operation.

Specifically, in this specific implementation, the command receiving unit receives a write command, and when a write operation is executed on the storage unit corresponding to the address information indicated by the write command, the ECC coding and decoding unit 48 forms an ECC corresponding to the data to be written in the write operation, and stores the ECC in the storage unit 41 corresponding to the address information indicated by the write command. After the write operation is completed, when a subsequent read operation is executed on the storage unit corresponding to the address information, the ECC coding and decoding unit 48 decodes the ECC. Wherein, it may be determined whether an error occurs in the data to be read which is read by the read operation according to the decoding of the ECC coding and decoding unit 48, and then the numerical code in the association unit 42 may be modified.

Further, in this specific implementation, the numerical code in the association unit 42 may be modified according to whether the ECC coding and decoding unit 48 restores the data. Specifically, if the ECC coding and decoding unit 48 decodes the ECC and restores the data, which indicates that an error occurs in the data to be read which is read by the read operation, then in the association unit 42, the numerical code corresponding to the address information of the storage unit is modified to a combination of an invalid mark value and an identification code. If the ECC coding and decoding unit 48 decodes the ECC, but does not restore the data, which indicates that no error occurs in the data to be read which is read by the read operation, then in the association unit 42, the numerical code corresponding to the address information is modified to a combination of a valid mark value and a meaningless code, or the initial mark of the numerical code corresponding to the address information is retained.

In other specific implementations of the present disclosure, the ECC coding and decoding unit 48 decodes the ECC, but does not restore the data, however, it may be determined that an error occurs in the data to be read which is read by the read operation according to the decoding of the ECC coding and decoding unit 48, then in the association unit 42, the numerical code corresponding to the address information of the storage unit is modified to a combination of an invalid mark value and an identification code.

Figure 8:
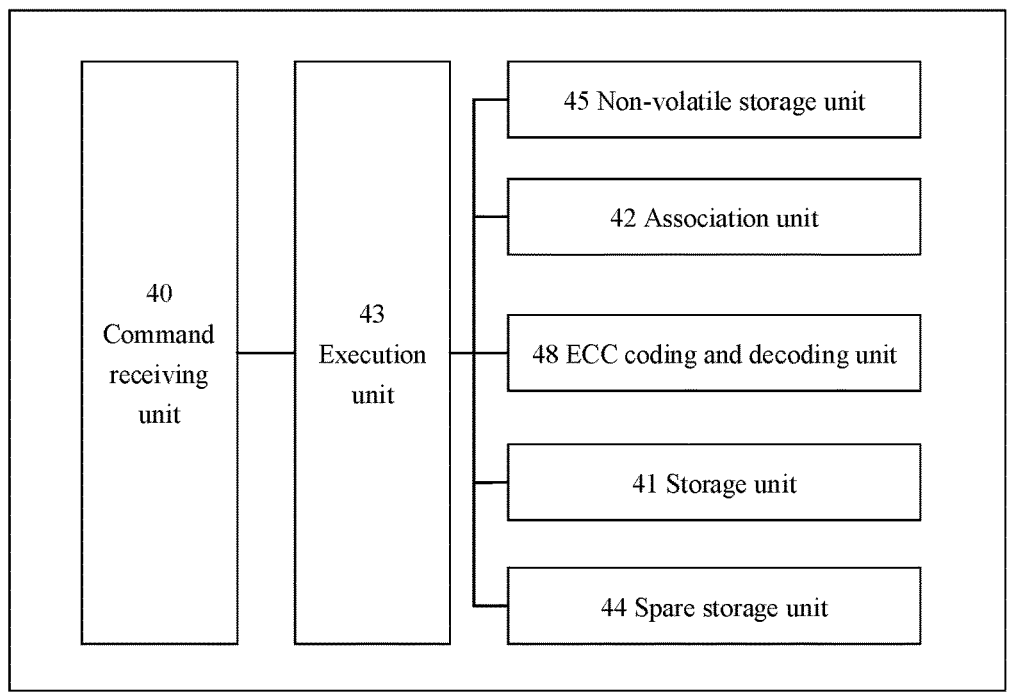
FIG. 8 is a schematic diagram of the framework of the fifth specific embodiment of a memory device according to the present disclosure.

In the fourth specific implementation, the execution unit 43 is connected to the ECC coding and decoding unit 48 and also to the storage unit 41. In the fifth specific implementation of the present disclosure, referring to FIG. 8, a schematic diagram of the framework of the fifth specific implementation of the memory device is shown. The execution unit 43 is connected to the ECC coding and decoding unit 48, and the ECC coding and decoding unit 48 is then connected to the storage unit 41. It may be understood that different connection relationships may be selected according to different needs.

Figure 9:
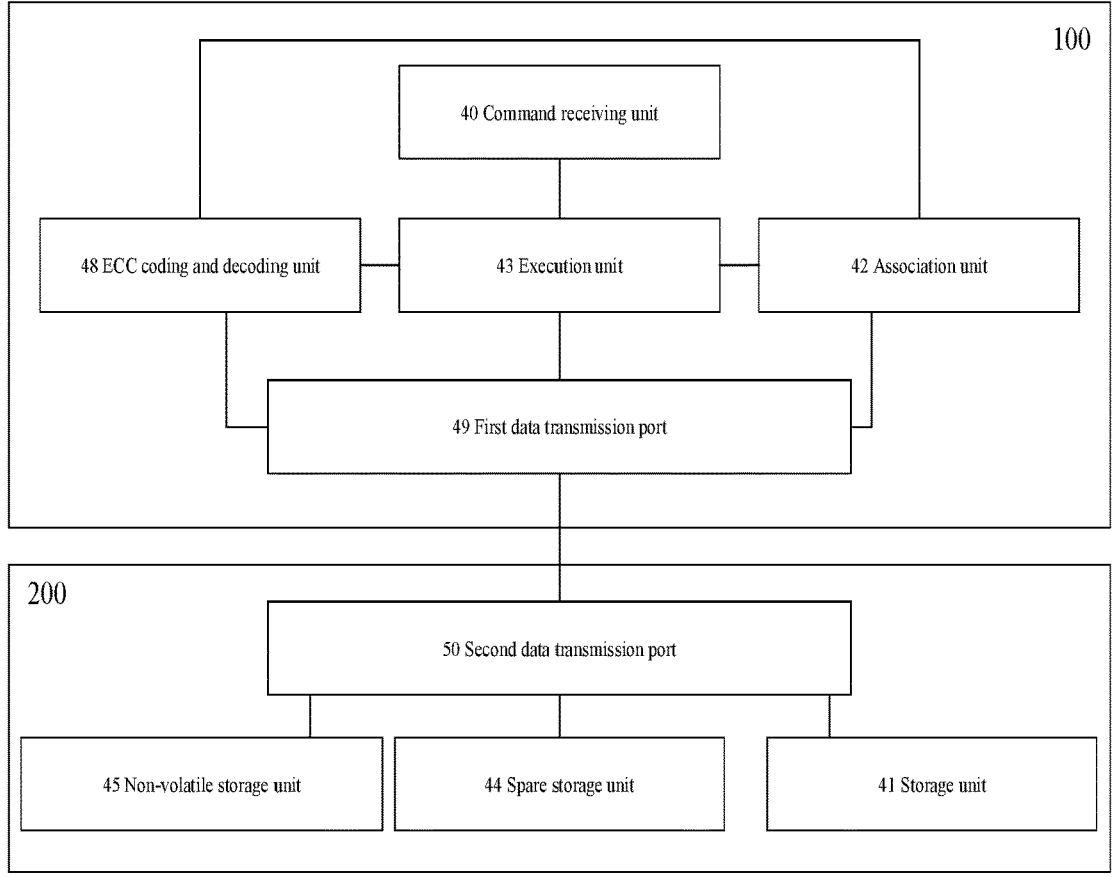
FIG. 9 is a schematic diagram of the framework of the sixth specific embodiment of a memory device according to the present disclosure.

The memory device according to the present disclosure further provides a sixth specific implementation. Referring to FIG. 9, a schematic diagram of the framework of the sixth implementation of the memory device is shown. Compared with the fourth implementation of the memory device, the memory device comprises a logic layer 100 and a plurality of storage layers 200 (only one storage layer is shown). The storage layers 200 may be DRAM chips, and the logic layer 100 may be a layer having logic circuits, such as a control chip or an interposer. The plurality of storage layers 200 may be vertically stacked above or below the logic layer 100. This is not limited in the present disclosure. The plurality of storage layers 200 may be integrated together by other packaging methods.

The command receiving unit 40, the association unit 42, the execution unit 43, and the ECC coding and decoding unit 48 may be all arranged in the logic layer 100, and the storage unit 41, the spare storage unit 44 and the non-volatile storage unit 45 are arranged in the storage layers 200. In another specific implementation of the present disclosure, the association unit 42 and the ECC coding and decoding unit 48 may be arranged in the storage layers 200, the spare storage unit 44 may be arranged in the logic layer 100, and the non-volatile storage unit 45 may be arranged in the logic layer 100.

In this specific implementation, the logic layer 100 has at least one first data transmission port 49, and the storage layers 200 have at least one second data transmission port 50. Instructions and data are transmitted between the logic layer 100 and the storage layers 200 through the first data transmission port 49 and the second data transmission port 50.

Further, in the sixth specific implementation, the execution unit 43 is connected to the ECC coding and decoding unit 48, and also to the storage unit 41 through the first data transmission port 49 and the second data transmission port 50. In the seventh specific implementation of the present disclosure, the execution unit 43 is connected to the ECC coding and decoding unit 48, and the ECC coding and decoding unit 48 is then connected to the storage unit 41 through the first data transmission port 49 and the second data transmission port 50. It may be understood that different connection relationships may be selected according to different needs.

The above description is a preferred implementation of the present disclosure, it should be noted that for a person of ordinary skill in the art, various improvements and modifications may be made without departing from the principle of the present disclosure, and those improvements and modifications should also be regarded as falling into the protection scope of the present disclosure.

What is claimed is:

1. A read and write method, comprising: applying a read command to a memory device, the read command indicating address information; reading data to be read from a storage unit corresponding to the address information indicated by the read command; and if an error occurs in the data to be read, associating the address information indicated by the read command with a spare storage unit, and backing up the address information indicated by the read command and association information between the address information and the spare storage unit in a non-volatile storage unit based on a preset rule;

wherein a lookup table is provided, the address information of the storage unit and a numerical code corresponding to the address information are recorded in the lookup table, the numerical code being composed of a first type code and a second type code, the first type code being used to mark whether the address information is valid, the second type code being used to record an identification code for identifying the spare storage unit; and if the error occurs in the data to be read, then in the lookup table, the first type code of the numerical code corresponding to the address information indicated by the read command is modified to an invalid mark value, and the second type code is modified to the identification code for identifying the spare storage unit; and the method further comprises: recording a number of times of modification of the second type code, and generating the identification code for identifying the spare storage unit according to the number of times of modification.

2. The read and write method according to claim 1, wherein the preset rule is a preset period or a preset action.

3. The read and write method according to claim 1, further comprising: after the memory device is started, loading the address information and the association information between the address information and the spare storage unit from the non-volatile storage unit.

4. The read and write method according to claim 3, wherein the address information indicated by the read command is associated with the spare storage unit by the identification code.

5. The read and write method according to claim 3, further comprising: if the error occurs in the data to be read, marking the address information indicated by the read command as invalid and backing up an invalid mark in the non-volatile storage unit based on the preset rule, and loading the invalid mark from the non-volatile storage unit after the memory device is started.

6. The read and write method according to claim 5, further comprising: if no error occurs in the data to be read, marking the address information indicated by the read command as valid and backing up a valid mark in the non-volatile storage unit based on the preset rule, and loading the valid mark from the non-volatile storage unit after the memory device is started.

7. The read and write method according to claim 5, wherein the address information that is not marked as invalid is initially set as valid and a valid mark is backed up in the non-volatile storage unit based on the preset rule, and after the memory device is started, the valid mark is loaded from the non-volatile storage unit.

8. The read and write method according to claim 7, wherein the reading data to be read from a storage unit corresponding to the address information indicated by the read command further comprises: reading, from the storage unit corresponding to the address information indicated by the read command, a first ECC corresponding to the data to be read; and if the error occurs in the data to be read is determined by:
decoding the first ECC to determine whether the error occurs in the data to be read.

9. The read and write method according to claim 1, wherein the numerical code has an initial value, the first type code is a valid mark value and the second type code is a meaningless code in the initial value.

10. The read and write method according to claim 1, wherein a write command is applied to the memory device;

if second address information indicated by the write command is marked as valid, a write operation is executed on a second storage unit corresponding to the second address information indicated by the write command; and if the second address information indicated by the write command is marked as invalid, the execution of the write operation on the second storage unit corresponding to the second address information indicated by the write command is stopped, and the write operation is executed on a second spare storage unit identified by a second identification code corresponding to the second address information indicated by the write command.

11. The read and write method according to claim 10, wherein when the write command is applied to the memory device, the second address information indicated by the write command is used as an index to search a second numerical code in the lookup table.

12. The read and write method according to claim 10, wherein executing the write operation on the second storage unit corresponding to the second address information indicated by the write command further comprises:
  forming a second ECC corresponding to data to be written in the write operation, and writing the second ECC, together with the data to be written, into the second storage unit corresponding to the second address information indicated by the write command.

13. The read and write method according to claim 1, wherein after the applying a read command to a memory device and before the reading data to be read from a storage unit corresponding to the address information indicated by the read command, the method further comprises: determining whether the address information indicated by the read command is valid; if the address information indicated by the read command is valid, executing a read operation on the storage unit corresponding to the address information indicated by the read command; and if the address information indicated by the read command is invalid, stopping the execution of the read operation on the storage unit corresponding to the address information indicated by the read command, and executing the read operation on the spare storage unit identified by the identification code corresponding to the address information indicated by the read command.

14. The read and write method according to claim 1, further comprising: in a case where the error occurs in the data to be read, if the data to be read is corrected, storing the corrected data in the spare storage unit; and if the data to be read is not corrected, storing the data to be read in the spare storage unit.

15. A memory device, comprising:
  a command receiving unit, configured to receive a read command or a write command;
  a storage unit, configured to correspond to address information indicated by the read command or the write command;
  a spare storage unit;
  an association unit, configured to record the address information and association information between the address information and the spare storage unit;
  an execution unit, configured to execute a read operation or a write operation on the storage unit or the spare storage unit; and
  a non-volatile storage unit, configured to back up the address information and the association information between the address information and the spare storage unit recorded by the association unit based on a preset rule;
  wherein the association unit is a lookup table, the address information of the storage unit and a numerical code corresponding to the address information are recorded in the lookup table, the numerical code being composed of a first type code and a second type code, the first type code being used to mark whether the address information is valid, the second type code being used to record an identification code for identifying the spare storage unit; and if an error occurs in data to be read, then in the lookup table, the first type code of the numerical code corresponding to the address information indicated by the read command is modified to an invalid mark value, and the second type code is modified to the identification code for identifying the spare storage unit; and
  the memory device further comprises: an identification code generation unit, connected to the association unit, and configured to record a number of times of modification of the second type code and generate the identification code for identifying the spare storage unit according to the number of times of modification.

16. The memory device according to claim 15, wherein the association unit associates the address information with the spare storage unit by the identification code.

17. The memory device according to claim 15, wherein the association unit is further configured to record mark information, the mark information recording whether the address information is valid or invalid.

* * * * *